United States Patent [19]

Lawrence et al.

[11] 3,849,733

[45] Nov. 19, 1974

[54] INTERFACE APPARATUS FOR RECEIVING AND MONITORING PILOT SIGNALS WHICH CONTROL A TIMING SIGNAL GENERATOR

[75] Inventors: Thomas Russell Lawrence, Omaha, Nebr.; Burton R. Saltzberg, Middletown, N.J.

[73] Assignee: Bell Telephone Laboratories Incorporated, Murray Hill, N.J.

[22] Filed: May 23, 1973

[21] Appl. No.: 363,299

[52] U.S. Cl. ................. 328/155, 328/133, 328/136, 328/151, 307/DIG. 1, 307/219, 328/73

[51] Int. Cl. ............................................ H03b 3/06

[58] Field of Search ....... 328/151, 133, 72, 73, 136, 328/155; 307/204, 219, DIG. 1

[56] References Cited

UNITED STATES PATENTS

| | | | |
|---|---|---|---|
| 3,427,556 | 2/1969 | Jennings et al. | 328/73 X |
| 3,654,564 | 4/1972 | Tisi et al. | 328/133 X |
| 3,683,285 | 8/1972 | Wild | 328/133 |
| 3,688,202 | 8/1972 | Naubereit et al. | 328/133 |
| 3,751,685 | 8/1973 | Jaeger | 302/219 |
| 3,764,902 | 10/1973 | Rodine | 328/133 X |

*Primary Examiner*—John S. Heyman
*Attorney, Agent, or Firm*—Roy C. Lipton

[57] ABSTRACT

A master oscillator is phase locked to a wave derived from the countdown of a pilot signal received over either a principal or a standby pilot line. An interface unit for each pilot line compares the running count of the downcounter at the beginning of a cycle of the master oscillator wave with a stored count obtained in a prior cycle. If there is a substantial comparison match, the running count is overwritten into the store to compensate for slow drift between the frequenices of the pilot and oscillator. If a substantial mismatch is encountered, a pilot malfunction is presumed and the oscillator switches to the standby pilot or free runs if the standby pilot status is bad. The initial mismatch is presumed to be a momentary malfunction, such as a noise hit, and the stored count is "stuffed" into the downcounter at the beginning of the oscillator wave cycle to restore the prior phase relation between the downcounter operating cycle and the oscillator wave. Repeated mismatches are presumed to indicate a prolonged malfunction of the pilot and the downcounter is phase aligned with the downcounter of the other unit if the other pilot status is good or phase aligned with the oscillator wave if the other pilot status is bad.

14 Claims, 3 Drawing Figures

PATENTED NOV 19 1974

3,849,733

SHEET 3 OF 3

INTERFACE APPARATUS FOR RECEIVING AND MONITORING PILOT SIGNALS WHICH CONTROL A TIMING SIGNAL GENERATOR

FIELD OF THE INVENTION

This invention relates to interface units for receiving and distributing incoming pilot signals which control the frequency of a timing signal generator, such as a phase-locked oscillator, and, more particularly, to units which receive and monitor redundant sources of pilot signals to supply standby pilot signals to the generator in the event of a failure or malfunction of a principal source of pilot signals.

DESCRIPTION OF THE PRIOR ART

In synchronous systems, such as time-division multiplex systems, it is necessary that the clock signal supply at the receiving station is synchronized with the clock signal at the sending station to properly assemble and disassemble signal trains at the two stations. In multiple station synchronous systems, a master clock supply may be provided at one station. Other stations might then receive clock signals from the master and phase lock a local oscillator to the received clock signals. In this manner, the frequency of the clocking signals at any station is the same as the master clock signal frequency.

Periods of time may exist wherein stations do not receive clock signals from the master. Synchronism is maintained, however, by maintaining the frequency of the local station clocking signals fixed. It is apparent that the master supply frequency should always be maintained at a fixed frequency and free of any substantial phase jitter so that the system synchronization is not lost during these periods of time. A preferable method of maintaining frequency and phase fixed is to phase lock the master oscillator to a high frequency clock standard. The clock standard components are expensive, however, and one standard supplies many different users. Thus, the location of the synchronous system master station is usually remote from the standard. A pilot signal is, therefore, derived from the standard and transmitted over a pilot line to the master station where the frequency of the pilot signal is divided or counted down to the output frequency of the master oscillator. The counted down pilot wave can now be supplied to the master oscillator as a timing wave which phase locks the oscillator to the phase of the counted down pilot.

The pilot line, being a transmission line, has malfunctions, such as interferences; and failures, such as outages. Accordingly, it is known to provide a standby pilot line which carries the pilot signal by a different path to the master station. Interface units which receive and monitor both the primary and standby pilot signals normally count down the primary signal and supply the counted down wave to the master oscillator. In the event that a malfunction or failure occurs, however, the interface units switch to the standby pilot, supplying a counted down standby pilot wave to the master oscillator. Upon termination of the malfunction, the interface units switch back to the primary pilot supply. It is a broad object of this invention to provide an improved arrangement for monitoring and supplying pilot or timing waves.

A preferred approach to the monitoring of the pilot wave is to compare the phase of the timing wave (that is, the counted down pilot signal) with the phase of the master oscillator output. A malfunction is then presumed if the phase of the pilot substantially changes relative to the phase of the oscillator output, whereupon the interface units switch to the standby. It is known in the art to take advantage of inherent capabilities of a wave downcounter to provide running counts for each cycle of the down counted wave to thus obtain designations of various phases of the countdown wave cycle. If the same running count is produced whenever the oscillator output passes through some fixed phase angle, the frequency of the down counted wave is therefore the same as the frequency of the oscillator output. There is always, however, some slow drift in the frequency relationship and, thus, in the phase relationship between the pilot signal and the master oscillator. In addition, the pilot line is conventionally subjected to momentary malfunctions, such as noise hits, which may add or delete pilot clock signals to improperly shift the phase of the cyclic downcounter operation.

It is, therefore, an object of this invention to provide accommodation for slow drift. It is a further object of this invention to recognize and compensate for momentary malfunctions. It is a more specific object of this invention to eliminate phase shifts of the cyclic operation of the downcounter due to momentary malfunctions.

A prolonged malfunction also shifts the phase of the cyclic downcounter operation, which shift is likely to be of large magnitude. If these large magnitude downcounter phase shifts are not corrected before the malfunction terminates and the interface unit switches back to the downcounted pilot signal obtained from the downcounter, the phase-locked loop will be subjected to a corresponding large magnitude phase shift. It is, therefore, a further object of this invention to prevent phase shifts of the loop when there is a prolonged malfunction of the pilot supply. A more specific object of this invention is to correct for large magnitude countdown phase shifts before the interface unit switches back to the associated pilot supply.

SUMMARY OF THE INVENTION

In the illustrative embodiment of the invention, each interface unit includes a countdown circuit for providing a down counted pilot wave to a phase-locked loop and for providing running counts for each cycle of the counter operation to define various phase angles of the countdown wave. Periodically, in response to a transition of the loop output (zero phase angle), the running count is read out and compared with a previously stored count. If there is an approximate match (the match not having to be exact since there may be a slight permissible drift), it is logically decided that there is no malfunction of the pilot line, which decision is provided by a logic circuit maintaining a normal logic state. To accommodate for the drift, the count in the store is now overwritten with the running count that has been read out. Thereafter, in response to the initial transition of a subsequent loop pulse, a new running count is read out and compared with the newly stored number.

In the event, however, that there is a comparison mismatch, it is initially assumed by the logic circuit that there is a momentary malfunction, and the logic circuit advances to an appropriate logic state consistent with this decision. If the standby pilot status is good, the supply is switched to the standby and, alternatively, if the standby status is bad, the supply is blocked and the loop runs free. In the primary interface unit, the running count just read out is discarded and, in response to the initial portion of a subsequent clock pulse, the previously stored count is "stuffed" into the downcounter. The phase of the downcounter operation is thus restored to the same operation phase that the downcounter had when there was the most recent comparison match. Readouts and comparisons are resumed and, if the malfunction is momentary, the subsequent comparisons will again match and, since the phase of the downcounter is restored, the improper phase shift is thus eliminated. The primary pilot is therefore restored without any phase shift of the down counted pilot wave.

In the further event, however, that the subsequent comparisons do not match, it is logically assumed by the logic circuit that there is a prolonged malfunction. The status of the other unit is examined and the logic circuit advances to one "malfunction" logic state if the other unit has good status (that is, no malfunction of its pilot) and to another "malfunction" logic state if the other unit has bad status.

It is a feature of this invention that, when there is a prolonged malfunction, the phase of the countdown circuit is aligned with the phase of the countdown circuit in the other unit in the event that the other unit has good status. Accordingly, the primary pilot countdown wave is substantially in phase with the standby pilot countdown wave and, after the termination of the malfunction, switching from the standby back to the primary will not be accompanied by a phase shift of the loop input.

It is another feature of this invention that, when there is a prolonged malfunction, the phase of the countdown circuit is aligned with the phase of the loop supply in the event that the other unit has bad status (and, as noted above, the loop is therefore running free). Accordingly, after the termination of the malfunction, the primary pilot countdown wave will be reapplied to the loop without shifting the phase of the loop output.

The foregoing and other objects and features of this invention will be more fully understood from the following description of an illustrative embodiment thereof taken in conjunction with the accompanying drawings.

DETAILED DESCRIPTION

Figure 1:
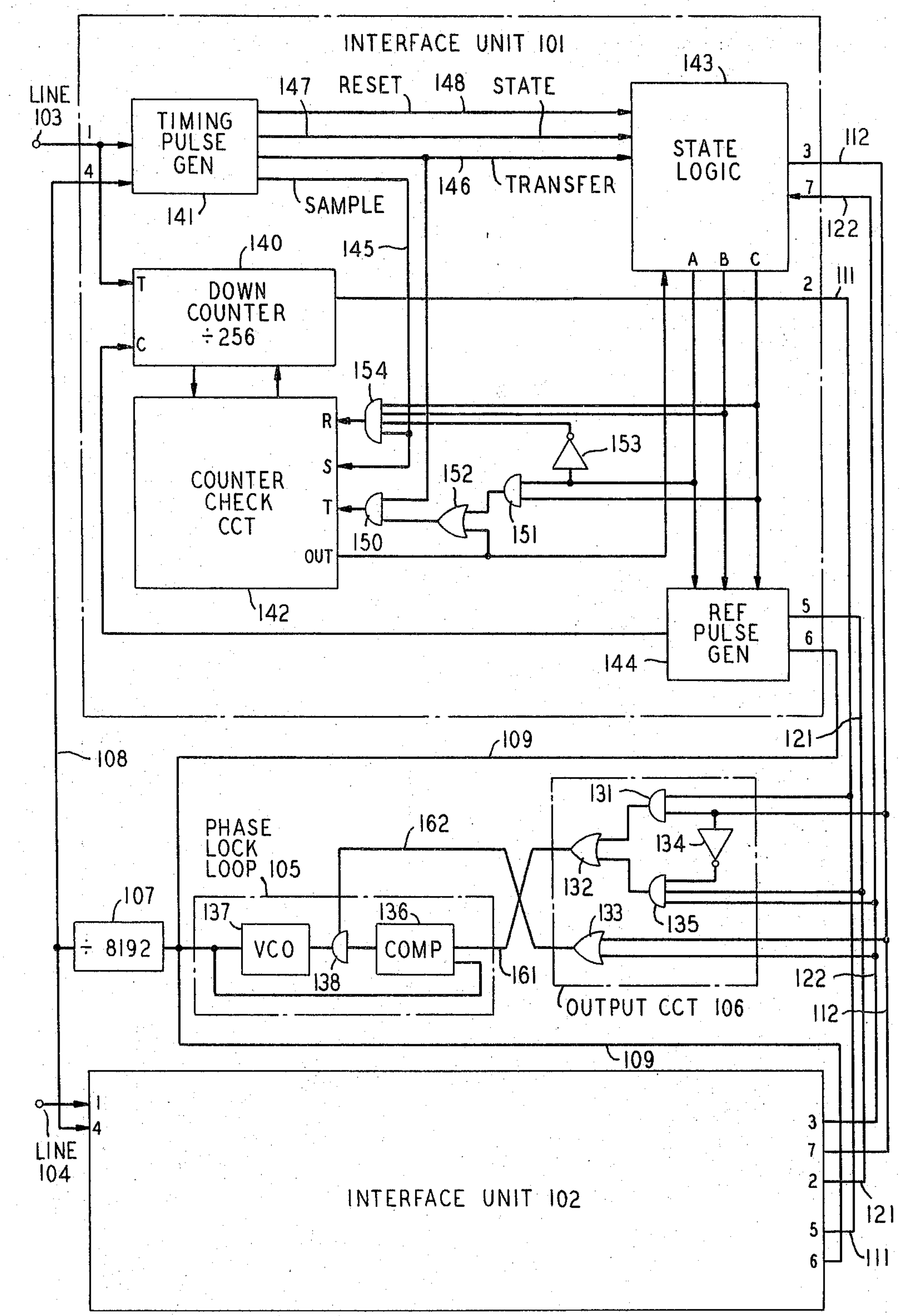
FIG. 1 shows, in block form, a master timing supply system and the manner of monitoring pilot waves and supplying timing waves derived from the pilot waves to the master timing supply oscillator.

The embodiment of applicants' invention illustrated in FIG. 1 utilizes a phase-locked loop, identified as phase-locked loop 105, as the master oscillator. Phase-locked loop 105 is arranged to be phase locked to a wave on lead 161 when an enabling signal is on lead 162 and is arranged to free run at an intermediate frequency when a disabling signal is on lead 163. The wave on lead 161 is derived from an incoming pilot signal on line 103, under normal conditions, in a manner described hereinafter and, under certain alternative conditions, is derived from an incoming pilot signal on line 104. The output of phase-locked loop 105, which in the illustrative embodiment has a nominal intermediate frequency of 8 kHz, is applied to countdown circuit 107 and is also applied by way of lead 109 to input terminals 5 of interface units 101 and 102. Countdown circuit 107 down counts the loop output wave by a factor of 8,192 to derive a wave of 8,000/8,192 Hz and this wave is applied by way of lead 108 to input terminals 4 of interface units 101 and 102.

The pilot signals on lines 103 and 104 are preferably derived from a common remote clock standard having a clock frequency of 2,048 kHz. Lines 103 and 104 are connected to input terminals 1 of interface units 101 and 102, respectively. The interface units are arranged in substantially the same manner and, in general, function to count down the incoming pilot signal on terminal 1 to provide an 8 kHz pilot countdown wave to terminal 2 of the interface unit. Additionally, the interface unit, such as interface unit 101, monitors the pilot signal by periodically comparing the phase of the output of phase-locked loop 105 with the cyclic operation of the countdown circuit. The periodic indication of the output phase of loop 105 is obtained from the output of countdown circuit 107 applied via lead 108 to input terminal 4. A status indication as to whether the output of phase-locked loop 105 is in phase with the countdown wave derived from the incoming pilot signal is provided on output terminal 3. It is presumed that the phase-locked loop normally operates properly and this status check therefore principally indicates whether or not a good pilot signal is being received.

The countdown wave derived by interface unit 101 from the pilot on line 103 and the status indication provided by interface unit 101 are passed by way of terminals 2 and 3 to leads 111 and 112, respectively. Similarly, the output countdown wave derived from the pilot signal on line 104 and the status indication provided by interface unit 102 and passed out through terminals 2 and 3 to leads 121 and 122, respectively.

Leads 111 and 112 extend to terminals 5 and 7, respectively, of interface unit 102 and leads 121 and 122 extend to terminals 5 and 7, respectively, of interface unit 101. Additionally, leads 111, 112, 121 and 122 are connected to output circuit 106.

In accordance with applicants' specific embodiment of their invention, the countdown circuit in each interface unit develops running counts indicating the phases of each cycle of the pilot countdown wave. At the beginning of each cycle of the loop countdown wave derived from countdown circuit 107, the running count is read, on the fly, and compared with a stored count normally obtained at the beginning of the immediately prior cycle of the loop countdown wave. In response to a comparison match or near match, the newly read count is overwritten into the store for subsequent comparison with the count in the next cycle. If there is a substantial mismatch of the counts, a momentary malfunction of the pilot is presumed and this results in producing a bad status indication on terminal 3. The overwriting of the new count into the count store is precluded and the store count is stuffed into the pilot wave downcounter at the beginning of the next cycle of the loop countdown wave, whereby the pilot wave downcounter and the pilot countdown wave are restored to the phase relation with the loop wave that existed in the prior cycle. If the counts continue to mismatch, a prolonged malfunction of the pilot is presumed and the phase of the pilot countdown wave is aligned with the phase of the other unit countdown wave (which appears on terminal 5) if the other unit is sending a good status indication (which appears on terminal 7) or, alternatively, is aligned with the phase of the phase-locked loop wave (which appears on terminal 6).

Output circuit 106 passes the countdown wave on lead 111 to lead 161 if a good status signal is applied to lead 112 by interface unit 101. Conversely, output circuit 106 passes the countdown wave on lead 121 to output lead 161 if the status signal applied to lead 111 by interface unit 101 is bad while interface unit 102 is passing a good status signal to lead 122. In either event, output circuit 106 passes the good status on either lead 112 or lead 122 to lead 162 to provide thereon an enabling signal. In the event, however, that neither interface unit is providing a good status signal, output circuit 106 blocks the application of any timing wave to output lead 161 and provides a disabling signal to lead 162. In output circuit 106, the passage of the 8 kHz pilot countdown wave on lead 111 is provided by AND gate 131 and OR gate 132. AND gate 131 is controlled by the status signal on lead 112 and if there is a good status signal on this latter lead, gate 131 is enabled and the pilot countdown wave on lead 111 is passed to output lead 161.

The pilot countdown wave provided by interface unit 102 to lead 121 is passed to AND gate 135. AND gate 135 is enabled by a good status signal on lead 122, together with the inversion of a bad status signal on lead 112, the inversion being provided by inverter 134. AND gate 135, when enabled, passes the pilot countdown wave on lead 121 through OR gate 132 to lead 161. The provision of a good status signal on either of leads 112 or 122 is passed by OR gate 133 to output lead 162 as an enabling signal. Lack of a good status signal on either of leads 112 or 122 removes the enabling signal on lead 162 and substitutes therefor a disabling signal.

The 8 kHz pilot countdown wave on lead 161 is passed to phase-locked loop 105. Phase-locked loop 105 is arranged as a modification of a conventional phase-locked loop, including therein a voltage-controlled oscillator, identified as oscillator 137, and a phase comparator, such as comparator 136, and is modified by the provision of switch gate 138 in the loop between comparator 136 and voltage-controlled oscillator 137. Voltage-controlled oscillator 137 preferably includes a conventional voltage-controlled oscillatory circuit together with a countdown circuit for down counting the oscillator output wave to a wave which nominally has an 8 kHz frequency. The 8 kHz pilot countdown wave on lead 161 is passed to one input of phase comparator 136, the other input to the comparator being provided by the 8 kHz loop wave derived from the output of voltage-controlled oscillator 137. The output of comparator 136 constitutes a voltage related to the phase difference, if any, between the output of oscillator 137 and the wave on lead 161. This voltage signal is passed through normally enabled switch gate 138 to the input of voltage-controlled oscillator 137 to modify the frequency of the oscillator output, thereby modifying, in turn, the phase of the output, and this new output is fed back to phase comparator 136 to continue the process until a phase lock is achieved, as is conventional for a phase-locked loop. The provision of switch gate 138 opens the loop, however, in the event a disabling signal is applied to lead 162 by output circuit 106. In this latter event, with the loop between phase comparator 136 and voltage-controlled oscillator 137 open, the oscillator runs free at the 8 kHz frequency.

As previously noted, each interface unit is arranged in substantially the same way. As seen in FIG. 1, interface unit 101 generally includes downcounter 140, timing pulse generator 141, counter check circuit 142, state logic circuit 143 and reference pulse generator 144. In addition, interface unit 101 provides various interconnections for these circuits, which interconnections include LOGIC gates 150 through 154.

The incoming pilot wave on line 103 applied to terminal 1 is passed to downcounter 140 and timing pulse generator 141. Downcounter 140 preferably comprises an eight-stage downcounter, which, among its several functions, counts down the incoming pilot wave from 2048 kHz to 8 kHz and provides the countdown pilot wave to output terminal 2 of interface unit 101. Counter 140 therefore counts to 256 for each cycle or rotation of the counter and these 256 counts, which may be considered running phase indications of the countdown pilot wave, are applied to counter check circuit 142. Other operations of counter 140 include the resetting and clamping thereof to an initial or zero count in response to a clearing signal from reference pulse generator 144 and the entering therein of a new count provided by counter check circuit 142 in a manner described hereinafter.

The countdown output wave of phase-locked loop 105 derived from countdown circuit 107 and received by way of lead 108 and input terminal 4 of interface unit 101 is applied to timing pulse generator 141. The two inputs to timing pulse generator 141, therefore, constitute the incoming pilot signal and the countdown loop wave. Timing pulse generator 141, in response to the transition at the beginning of each cycle of the countdown loop wave, produces four successive output pulses (at the repetition frequency of the pilot wave) on output leads 145 through 148. It was previously noted that the loop countdown wave has a frequency of 8,000/8,192 Hz. Counter 140, therefore, cycles 8,192 times during each cycle of the loop countdown wave. Thus, during one of the 8,192 cycles of the counter, timing pulse generator 141 generates its four pulses. The first pulse is applied to output lead 145 and is hereinafter referred to as the "sample pulse." The remaining three successive pulses are applied to leads 146 through 148, which pulses are hereinafter referred to as the "transfer pulse," the "state pulse" and the "reset pulse," respectively.

Counter check circuit 142 reads, on the fly, the number presently in counter 140 and comprises this counter number with a number previously stored in the check circuit. This reading and comparison is made in response to the sample pulse being applied to input terminal S of check circuit 142. Under the condition that there is a substantial correspondence in the two numbers, a good check signal is provided to terminal "OUT". Counter check circuit 142 also is arranged, in response to a transfer pulse being applied to input terminal T, to transfer the present counter number just read, and write this number in the number store by overwriting the number previously stored in the number store. This newly stored number will thereafter be compared with the next counter number obtained on the fly 8,192 counter cycles later, from counter 140. Counter check circuit 142 also has the capability of reading out the number stored in its number store in response to the application of a pulse on terminal R. This read out number is passed to counter 140, which thereupon stuffs the number into the counter stages.

The various logic states of interface unit 101 are controlled by state logic circuit 143. State logic circuit 143 provides various states designated by signal conditions on output terminals A and B, together with an "intermediate step" state (which will be further described hereinafter) designated by signal conditions on output terminal C. In addition, state logic circuit 143 provides the status indication of interface unit 101 to output terminal 3 of the unit. To provide this information, state logic circuit 143 monitors the terminal "OUT" comparator check signal of counter check circuit 142 and the status signal provided by the other interface unit, which status signal is derived by way of lead 122 and input terminal 7. In accordance with this information, and under control of timing instructions derived from the transfer, state and reset pulses on leads 146 through 148, state logic circuit 143 provides the various state and status designations described above.

Reference pulse generator 144 is controlled by the state designations on output terminals A, B and C of state logic circuit 143 to clamp counter 140 in the clear or reset condition, and to remove the clamp at the beginning of the cycle of phase-locked loop 105 or the beginning of the cycle of the pilot countdown wave from interface unit 102. Indications of the beginning of cycles of the phase-locked loop and the unit 102 pilot countdown wave are derived by way of leads 109 and 121, respectively. Lead 109 is connected by way of input terminal 6 to reference pulse generator 144 and lead 121 is connected by way of input terminal 5 to the reference pulse generator.

Initially we may assume that interface unit 101 and, more specifically, state logic circuit 143, is in the normal state. In this state "0" bits are applied to output terminals A and B and a "1" bit is applied to terminal C. The "0" bits inhibit the operation of reference pulse generator 144 and disable AND gates 151 and 154.

When a new cycle of the countdown loop wave on lead 108 is initiated, timing pulse generator 141 is enabled to produce its sequence of four pulses. The sample pulse produced on lead 145 is applied to input terminal S of counter check circuit 142 and the counter check circuit thereupon reads, on the fly, the number in counter 140, comparing it to the number previously stored in the number store of the counter check circuit. Assume that the two numbers substantially correspond. Counter check circuit 142 provides a good check signal at terminal "OUT", indicating that the check is good. This signal is applied by way of OR gate 152 to enable AND gate 150. When the transfer pulse appears on lead 145, it is passed through AND gate 150 and the number just derived from counter 140 is overwritten into the number store. State logic circuit 143, monitoring the good check signal, maintains itself in the normal state "00". This process is then repeated at the beginning of each cycle of the phase-locked loop countdown wave on lead 108 (that is, 8,192 counter cycles later) so long as the numbers substantially correspond.

Assume now there is a non-correspondence in the numbers (the numbers are more than one apart). Counter check circuit 142 signals this bad check to terminal "OUT". Gate 150 is not enabled and the transfer pulse is blocked by the gate. When the state pulse is generated, with counter check circuit 142 indicating a bad check, state logic circuit 143 presumes that there is a momentary malfunction and goes to the logic state "01". In this state, the bit sequence "01" is applied to output terminals A and B and a bad status signal is passed to output terminal 3 of interface unit 101. This bad status signal, as previously described, is passed to output circuit 106, which thereupon blocks the passage therethrough of the countdown pilot wave on output terminal 2 to phase-locked loop 105. At this time, the "1" bits on terminals B and C and the "0" bit on terminal A, inverted by inverter 153, enable AND gate 154. The reset pulse from the pulse generator 141 provides no function at this time.

When the sample pulse is generated, at the beginning of the next cycle of the countdown loop wave, the initial portion thereof is applied via gate 154 to input terminal R of counter check circuit 142. Counter check circuit 142 passes the stored number to counter 140 and then, in response to the final portion of the sample pulse on terminal S, reads out the new count in the counter. The stored number in the check circuit and the number read out from the counter obviously correspond and counter check circuit 142 provides a good check signal at terminal "OUT". Consequently, AND gate 150 is enabled and the transfer pulse transfers the new counter number into the number store. In addition, the transfer pulse moves state logic 143 into the "intermediate step" state, thereby providing a "0" bit on output terminal C. This disables AND gate 154. The state and reset pulses provide no change of the state of state logic circuit 143 at this time, since state logic 143 is in the "intermediate step" state.

In the next cycle of the countdown timing wave on lead 108, the sample pulse again enables counter check circuit 142 to read the number in counter 140 on the fly. A comparison is again made with the number stored in the check circuit. If this number check is good, AND gate 150 is enabled and the new number is overwritten into the number store. With the check being good, state logic 143 goes back to state "00" in response to the state pulse and terminates the "intermediate step" state, reapplying a "1" bit to terminal C. In addition, the good status signal is reapplied to output terminal 3.

Assume now that, with state logic 143 in the "intermediate step" state of state "01", when the counter number is read by 142, it finds that there is a non-correspondence with the stored number. AND gate 150 is therefore not enabled. In addition, the bad check signal provided by counter check circuit 142 is passed on to state logic circuit 143, which will now presume that there is a prolonged malfunction.

The transfer pulse generated by timing pulse generator 141 is now blocked by disabled gate 150, precluding the overwriting of the new number into the number store of counter check circuit 142. At this time, state logic 143 is monitoring the bad check signal and the status of the other interface unit and, in response to the application of the state pulse on lead 147, proceeds to one or the other of two prolonged malfunction states. Specifically, state logic circuit 143 will go to state "11" ("1" bits on terminals A and B) if the other interface unit is providing a good status signal through lead 122 and input terminal 7. Conversely, state logic circuit 143 goes to state "10" (bits "1" and "0" on terminals A and B) if the status signal on the other interface unit is bad. The reset pulse following the state pulse then terminates the "intermediate step" state and a "1" bit is reapplied to output terminal C.

Assume now that the other interface unit status is good and state logic circuit 143 therefore proceeds to logic state "11". This provides "1" bits to output terminals A and B, it being noted above that a "1" bit is also now provided to output terminal C. The "1" bits on output terminals A and C enable AND gate 151, enabling, in turn, AND gate 150 by way of OR gate 152. At the same time the "1" bit on output terminal A is inverted by inverter 153 to disable AND gate 154. With "1" bits on output terminals A, B and C, reference pulse generator 144 is enabled to monitor the countdown wave output of interface unit 102. This wave output, as previously noted, is provided from output terminal 2 of interface unit 102 and then, by way of lead 121 and input terminal 5, to reference pulse generator 144.

In response to the beginning of a cycle of the countdown wave output of interface unit 102, reference pulse generator 144 generates a clamping signal. This clamping signal is passed to counter 140, resetting the counter to its initial or zero count and maintaining it in this initial count. Thereafter, at the beginning of the next countdown wave cycle, reference pulse generator 144 removes the clamping signal and counter 140 is released to count the incoming pilot wave on line 103. Counter 140, having been clamped to the initial count; released at the beginning of the cycle of the interface unit 102 pilot countdown wave; and counting from a zero count at the same transition that the corresponding counter in interface unit 102 starts its count from a zero count; is therefore in-phase with the countdown circuit in interface unit 102. In the next cycle of the loop countdown wave on lead 108, timing pulse generator 141 again generates its series of pulses. The sample pulse enables counter check circuit 142 to make a number check, which is probably bad since counter 140 has just been reset. The transfer pulse, however, passes through gate 150, which has been enabled, transferring the new counter number into the number store. In addition, the application of the end of the transfer pulse to state logic 143 initiates a new "intermediate step" state and a "0" bit is applied to output terminal C. This provides "0" bits to gates 151 and 154, disabling the gates. Thereafter, the state and reset pulses are provided to state logic 143, but provide no functions during the "intermediate step" state. Throughout the remaining portion of the cycle of the loop countdown wave, state logic circuit 143 remains in this state "11" condition.

The next cycle of the loop countdown wave enables timing pulse generator 141 to generate a new sequence of four pulses. The first pulse is the sample pulse and counter check circuit 142 provides a new number check. If this number check is good, the subsequent transfer pulse will pass through gate 150 to transfer the new number to the number store. When the state pulse is generated, state logic circuit 143 goes back to normal state "00". This terminates the "intermediate step" state and the output on terminal C again provides a "1" bit. In addition, the state logic circuit reapplies a good status signal to terminal 3 of interface unit 101. The circuit is now back in its initial condition.

Assume now that, with state logic circuit 143 in state "11", when the sample pulse is generated counter check circuit 142 finds a bad number check. The transfer pulse now finds that AND gate 150 is blocked, precluding the transfer of the new number. Since the number check is bad, state logic circuit 143 maintains itself in state "11" when the state pulse is generated (presuming that the status of interface unit 102 is still good). When the reset pulse is generated, state logic circuit 143 terminates the "intermediate step" state and again provides a "1" bit to terminal C. Gate 151 is again enabled and reference pulse generator 144 again monitors the countdown wave output of interface unit 102 and the above-described rephasing of counter 140 and subsequent checking of the new counter number is again repeated.

If, with state logic circuit 143 in state "01" or state "11", the number check is bad and the status of interface unit 102 is also bad, state logic 143 goes to state "10" in response to the state pulse on lead 147. Thereafter, the reset pulse terminates the "intermediate step" state as described above and terminal C provides a "1" bit. Gate 151 is enabled, enabling gate 150 in the same manner as previously described relative to logic state "11". In logic state "10", however, reference pulse generator 144 monitors the output of phase-locked loop 105. This output of phase-locked loop 105 is applied by way of lead 109 and input terminal 6 to reference pulse generator 144. Thus, at the beginning of a new cycle of the loop wave (that is, when the wave goes negative), reference pulse generator 144 clamps counter 140 to the zero count. Thereafter, when the new loop cycle starts, reference pulse generator 144 removes the clamping signal to release counter 140. Counter 140 is thus released to start counting from its zero count at the same time that voltage-controlled oscillator 137 initiates its cycle. Counter 140 is therefore in-phase with voltage-controlled oscillator 137.

At the beginning of the new cycle of the loop countdown wave on lead 108, timing pulse generator 144 again generates the four pulses. Counter check circuit 142 now reads the number in counter 140, on the fly; provides a number check; and transfers the new number of the number store; while state logic 143 proceeds to the "intermediate step" state, all in the same manner that interface unit 101 performed these functions when the state logic circuit proceeded to the "intermediate step" state in logic state "11". Thereafter, in the next cycle of the loop countdown wave on lead 108, a new reading of counter 140 and number check is made. State logic circuit 143 thereafter goes to normal state "00" if the check is good or remains in logic state "10" if the check is bad and the status of interface unit remains bad.

Figure 2:
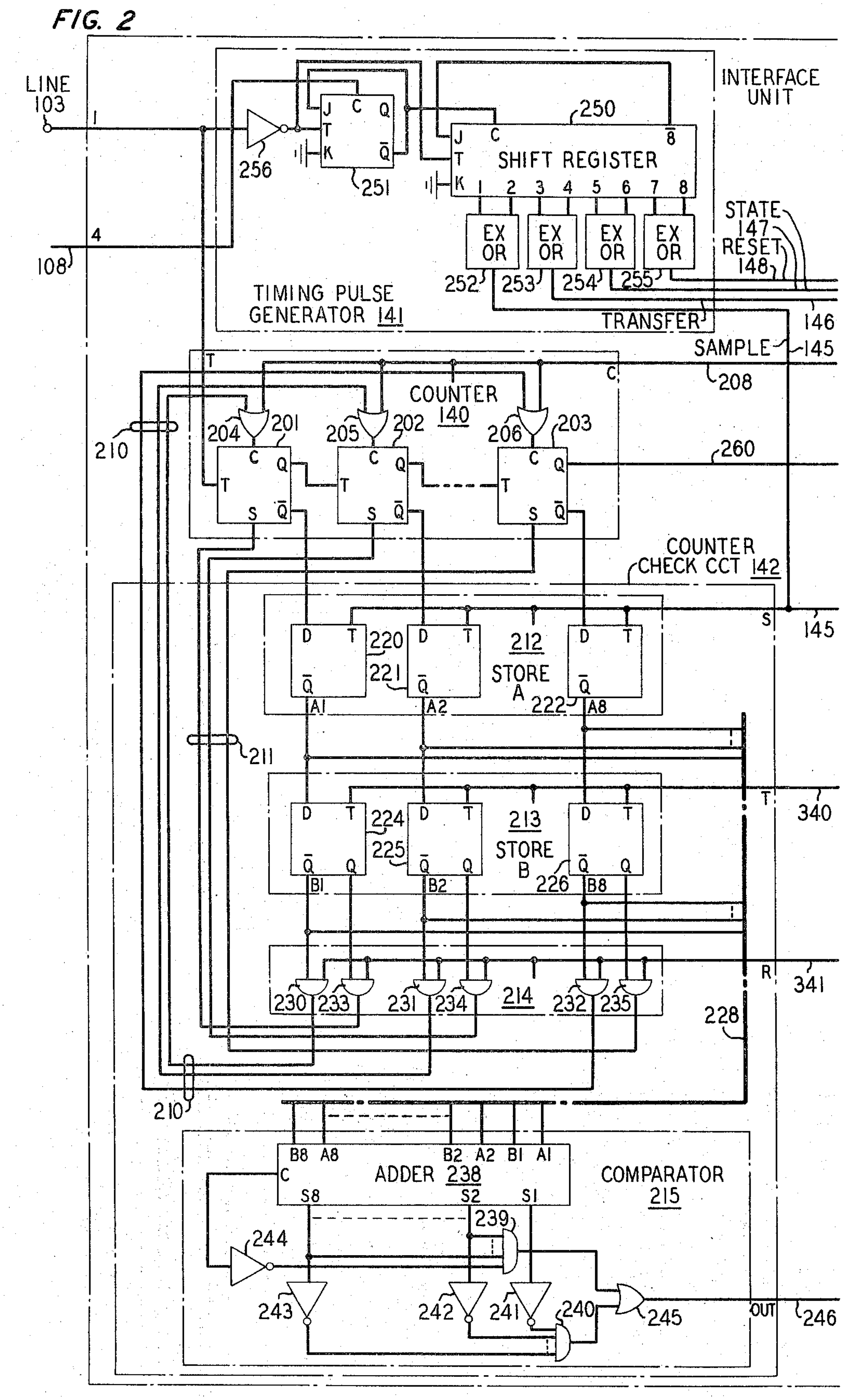
FIG. 2 and FIG. 3, when aligned side by side, disclose, in schematic form, the details of circuits and equipment which form an interface unit for monitoring the pilot wave and supplying the timing wave derived from the pilot.
Figure 3:
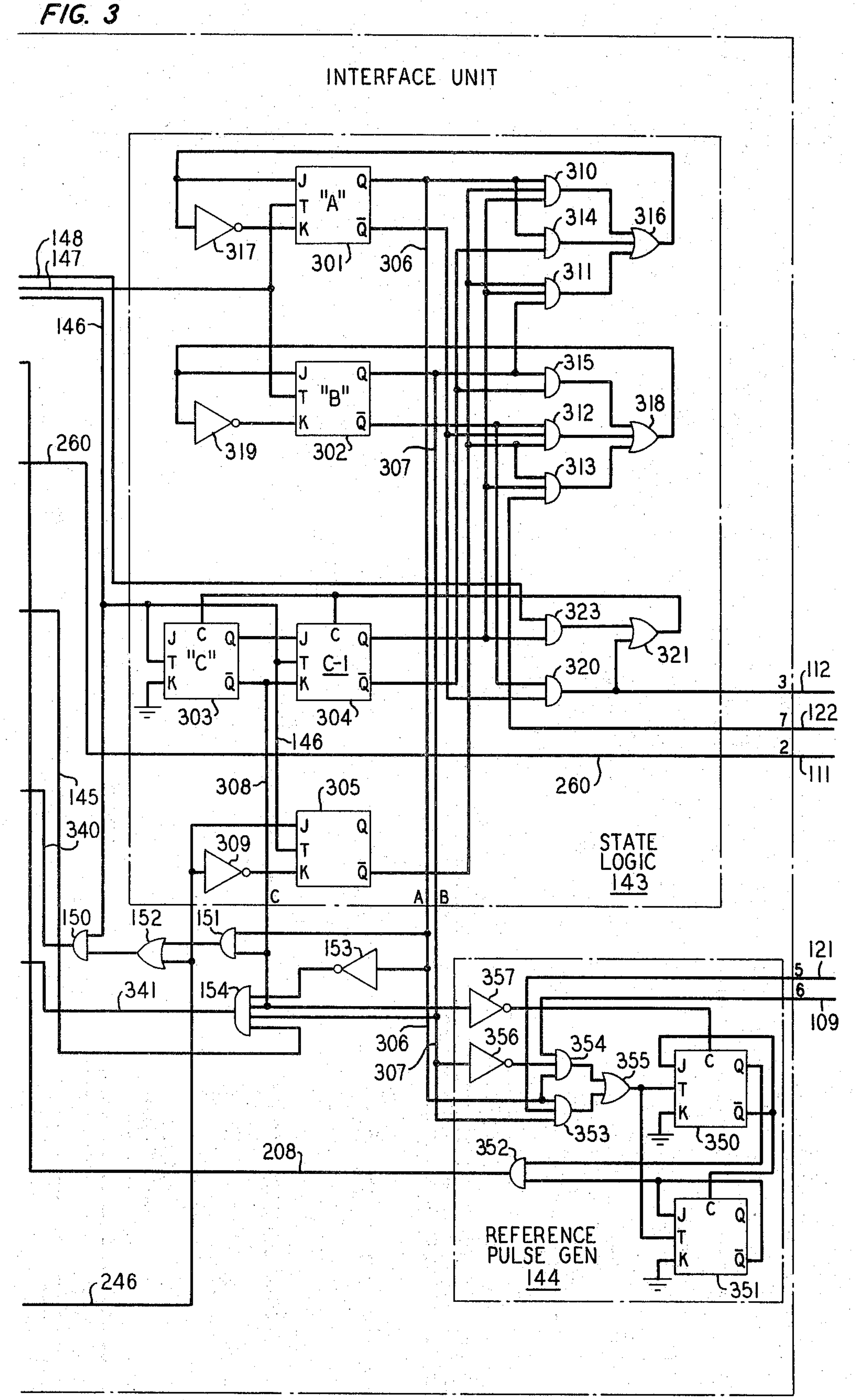

The principal components of the interface unit shown in FIGS. 2 and 3 are identified by the same numerals as the corresponding components are identified in interface unit 101 in FIG. 1. In accordance therewith, downcounter 140, timing pulse generator 141 and counter check circuit 142 are shown in FIG. 2, while state logic 143, reference pulse generator 144 and logic gates 150 through 154 are shown in FIG. 3. Downcounter 140 principally consists of eight flip-flop stages, the first and second stages and the last stage being shown. The first and second stages are identified as flip-flops 201 and 202, while the last stage is identified as flip-flop 203.

Each of the flip-flops in downcounter 140 constitutes a JK flip-flop. The J and K terminals are not shown, but are energized so that a negative transition applied to the input T terminal of flip-flop toggles the device from its present condition (SET or CLEAR) to the other one of its bistable conditions. A positive potential applied to its input S terminal clamps the flip-flop to the SET condition, while a positive potential applied to its input C terminal clamps the flip-flop to the CLEAR condition. Output signals, depending upon the condition of the flip-flop, will appear on the output Q and $\overline{Q}$ terminals.

The arrangement of downcounter 140 is such that the output Q terminal of all but the last flip-flop is connected to the input T terminal of the next subsequent flip-flop. The input T terminal of flip-flop 201 is connected to line 103, whereby the flip-flop is normally toggled by each negative transition of the incoming pilot signal. Each toggling of the flip-flop to the CLEAR condition provides a negative transition at its output terminal Q to toggle the next subsequent flip-flop; namely, flip-flop 202. This process is repeated for all intermediate flip-flops and the final flip-flop 203, whereby counter 140 acts in a binary counter. The output Q terminal of flip-flop 203 constitutes the output of counter 140 and this output signal is passed by way of lead 260 to output terminal 2 of the interface unit, as seen in FIG. 3. As is apparent, the wave on lead 260 is a countdown of the pilot wave, the pilot frequency being divided by the factor of $2^8$, or 256.

The input C terminals of each of the counter flip-flops are connected to OR gates. As shown in FIG. 2, OR gates 204 and 205 are connected to the first and second stages and OR gate 206 is connected to the eighth stage. The application of a positive signal to either input of any one of the OR gates results in the passage of the positive signal to the input C terminal of the associated flip-flop. This, in turn, clamps the flip-flop to the CLEAR condition.

One input to the OR gates constitutes lead 208. Lead 208, in turn, extends to the reference pulse generator 144, which, as previously noted, operates to align the phase of downcounter 140 with the phase of the downcounter of the other unit or to the phase of the phase-locked loop. In accordance therewith, and as described hereinafter, reference pulse generator 144 normally applies a negative signal to lead 208. To align the phase of the downcounter, reference pulse generator 144 first provides a positive signal to lead 208 to clamp counter 140 to the zero count and thereafter reapplies the negative signal to lead 208 to release counter 140 to resume counting pilot signals. The application of a negative signal to lead 208 does not affect counter 140. When the counter is to be aligned and reference pulse generator 144 sends a positive signal, it is passed by all of the OR gates 204 through 206 and all of the flip-flops in counter 140 are clamped to the CLEAR condition. Thereafter, reference pulse generator 144 reapplies the negative signal to lead 208; the outputs of OR gates 204 through 206 go negative, the flip-flops in counter 140 are released; and, since all of the flip-flops have been clamped to the CLEAR condition, counter 140 now proceeds to count the pilot signal clock pulse from an initial zero count.

The other inputs to OR gates 204 through 206 are connected to a plurality of leads, commonly identified as leads 210. The input S terminals of the flip-flop in downcounter 140 are connected to a plurality of leads, commonly identified as leads 211. As described hereinafter, leads 210 and leads 211 contain the number stored by counter check circuit 142 under the condition previously described wherein this number is to be "stuffed" into downcounter 140.

The principal components of timing pulse generator 141 constitute shift register 250, JK flip-flop 251, EXCLUSIVE OR gates 252 through 255 and inverter 256. Initially; that is, prior to the initial portion of the countdown loop wave, lead 108 is in a positive condition. This condition is passed to the C input of flip-flop 251 to clamp flip-flop 251 to the CLEAR condition. The output $\overline{Q}$ terminal of flip-flop 251 is therefore positive and this, in turn, clamps all of the stages in register 250 in the CLEAR condition. Shift register 250, therefore, has all "0" bits stored in its several stages.

Upon the initialization of the loop countdown wave, lead 108 goes negative. This removes the clamp from flip-flop 251. The next positive transition of the pilot on line 103 is inverted by inverter 256 and toggles the flip-flop to its SET condition, removing the clamp from shift register 250.

The following positive transition from line 103, inverted by inverter 256, is passed to the input T terminal of shift register 250. This toggles the first stage of the shift register, inserting a "1" bit therein. The outputs of the first stage and the second stage are applied to EXCLUSIVE OR gate 252. Since the first stage has a "1" bit therein and the second stage has a "0" therein, the outputs of the two stages differ and EXCLUSIVE OR gate 252 applies a pulse to lead 145, which pulse, as previously described, is identified as a sample pulse.

The next clock pulse from the pilot line shifts the "1" bit in the first stage to the second stage and toggles another "1" bit into the first stage. The conditions of the first stages are now the same and EXCLUSIVE OR gate 252 terminates the application of the sample pulse to lead 145.

In a similar manner, the third toggling of shift register 250 inserts "1" bits in all of the first three stages. A "1" bit in the third stage and a "0" bit in the fourth stage enables EXCLUSIVE OR gate 253 to pass the transfer pulse to lead 146, which transfer pulse is terminated upon the fourth toggling of shift register 250. Thereafter, from the fifth toggling to the sixth toggling of shift register 250, EXCLUSIVE OR gate 254 applies a state pulse to lead 147 and from the seventh to the eighth toggling of shift register 250, EXCLUSIVE OR gate 255 applies a RESET pulse to lead 148.

When the "1" bit is passed to the final or eighth stage, a negative condition is applied by the stage to the J input of the register. Subsequent toggling of shift register 250 is therefore precluded. This situation will continue to prevail until the approximate midpoint of the loop countdown wave. At this time the loop countdown wave again goes positive, flip-flop 251 is clamped to the CLEAR condition and flip-flop 251, in turn, clamps the stages of shift register 250 to the CLEAR condition, reinserting and maintaining "0" bits in all of the stages.

The principal components of counter check circuit 142 constitute store 212, store 213, gates 214 and comparator 215. In general, store 212 is enabled by the terminal portion of the sample pulse to read, on the fly, the count in downcounter 140. This number read by store 212 is then compared by comparator 215 with the number in store 213. As previously described, if there is a comparison match, a pulse is applied to input terminal T of counter check circuit 142. The number in store 212 is thereupon overwritten into store 213. In the event, however, that there is a comparison mismatch, a pulse is applied to input terminal R by the initial portion of the sample pulse and this enables gates 214 to read out the number in store 213 and apply that number to leads 210 and 211. As previously noted, the numbers on leads 210 and 211 are stuffed into downcounter 140. It is noted that this operation occurs at the initial portion of the sample pulse so that the number can then be read, on the fly, from counter 140 by the terminal portion of the pulse.

Store 212 contains eight DT flip-flops. In each of the flip-flops, with a positive condition applied to its D terminal, the flip-flop is SET by the application of a negative transition to its input T terminal. Conversely, the flip-flop is toggled to the CLEAR condition when a negative signal is applied to its input D terminal and a negative transition is applied to its T terminal. In store 212 the first and second and the final flip-flops are shown and identified as flip-flops 220, 221 and 222. The input T terminals are connected to input terminal S of counter check circuit 142, which, in turn, is conncted to the sample pulse on lead 145. The input D terminals of each of the flip-flops are connected to the output $\overline{Q}$ terminal of the corresponding one of the downcounter 140 flip-flops, thus reading the inverse of the count in counter 140. When flip-flop 201, for example, is in the SET condition, a negative potential is applied to the input D terminal of flip-flop 220 and the terminal portion (negative transition) of the sample pulse places flip-flop 220 in the CLEAR condition. Similarly, each of the other flip-flops in store 212 is placed in the inverse condition of the corresponding flip-flop in downcounter 140. Thus, the count in downcounter 140 is read out by the negative transition of the sample pulse; that is, the terminal portion of the sample pulse, and the inverse of the count or number is placed in store 212. The outputs of store 212 (namely, outputs A1 through A8), in turn, are obtained from the $\overline{Q}$ output terminals of the flip-flops. The output number of store 212 is, therefore, the number, read on the fly, from downcounter 140. This output number is passed on store 213 and, in addition, is applied by way of cable 228 to comparator 215.

Store 213 is arranged in substantially the same manner as store 212 and contains eight flip-flops, wherein there is shown the first and second stages and the eighth stage. The first and second stages are identified as flip-flops 224 and 225 and the eighth stage is identified as flip-flop 226. The output number of store 212 is applied to the input D terminals of the flip-flops in store 213. The input T terminals of the flip-flops are connected to input terminal T of counter check circuit 142 and input terminal T, in turn, is connected by way of leads 340 to gate 150, FIG. 3. As previously described, the transfer pulse on lead 146 is passed through gate 150 to overwrite the number in store 212 into store 213. More specifically, at the termination of the transfer pulse, there is a negative transition on lead 340 and this toggles flip-flops 224 through 226 in accordance with the output number of store 212. Thus, flip-flop 224 will be SET if flip-flop 220 is CLEAR or, stated another way, a "1" bit will be inserted in flip-flop 224 if a "0" bit is presently in flip-flop 220. In a corresponding manner the other flip-flops in store 213 store the inverse of the number in store 212.

The output Q and $\overline{Q}$ terminals of flip-flops 224 through 226 are connected to gate circuit 214. In addition, the output number of store 213 (identified as bits B1 through B8 and obtained from the $\overline{Q}$ output terminal) is also applied to cable 228 and thence to comparator 215. It is to be noted that the output numbers are obtained from the $\overline{Q}$ outputs of the flip-flops in stores 212 and 213 and, since the stores store the inverse, the numbers should be the inverse.

Comparator 215 principally consists of adder 238 and logic gates 239, 240 and 245. Adder 238 adds the number bit output of store 212 to the number bit output of store 213. Recalling that one number is the inverse of the other, if the two numbers exactly match, the "sum" (S1 through S8) leads of adder 238 would have "1" bits applied thereto and a "0" bit concurrently applied to the output "carry" (C) lead. The output "carry" lead is connected to inverter 244; and inverter 244, together with all of the "sum" leads, with the exception of the "sum" lead of the least significant bit (appearing on lead terminal S1), is connected to AND gate 239. Thus, if there is a perfect match, all of the input leads to AND gate 239 have "1" bits applied thereto. Gate 239 is therefore enabled, applying a signal by way of OR gate 245 to terminal OUT of counter check circuit 142. This signal is thus applied to lead 246, indicating a comparison match.

If the downcounter number is less than the previously stored number by a count of one, the least significant bit "sum" lead (S1) has a "0" bit applied thereto, the other "sum" leads have "1" bits applied thereto and the "carry" lead has a "0" bit applied thereto. Since gate 239 is not connected to this least significant bit "sum" lead, the operation of comparator 215 remains the same, applying a comparison match signal to lead 246. Thus, when the downcounter number is less than the stored number by a count of one it is presumed that there is a substantial match and comparator 215 provides the comparison match signal to lead 246.

Assume now that the number read from downcounter 140 on the fly is greater by one in count than the previously stored number in store 213. In that event, all of the "sum" leads of adder 238 have "0" bits applied thereto (while a "1" bit is applied to the output "carry" lead). The "0" bits on the "sum" leads are converted to "1" bits by inverters, such as inverters 241 through 243. This enables AND gate 240 and the gate applies an enabling signal through OR gate 245 to output lead 246. Thus, a comparison match signal is developed by comparator 215 in response to a substantial comparison match even though the number, read on the fly, is one greater than the previously stored number in store 213.

It was previously noted that the outputs of store 213 are read by gates 214. In gates 214, AND gates 230, 231 and 232 are connected to the $\overline{Q}$ outputs of appropriate ones of flip-flops 224 through 226. The other input to AND gates 230 through 232 are connected to input terminal R of counter check circuit 142 and input terminal R is, in turn, connected by way of lead 341 to AND gate 154.

As previously disclosed, the sample pulse is applied through AND gate 154 under the condition that the number in store 213 is to be stuffed into downcounter 140. The positive sample pulse on lead 341 enables AND gates 230 through 232 to read out the conditions on the output $\overline{Q}$ leads of flip-flops 224 through 226 and apply them by way of leads 210 and OR gates 204 through 206 to the input C terminals of flip-flops 201 through 203. Thus, if the first flip-flop, such as flip-flop 224 in store 213, is CLEAR, a positive condition is applied by way of its $\overline{Q}$ terminal through AND gate 230 and OR gate 204 to input terminal C of flip-flop 201. This drives flip-flop 201 to its CLEAR condition. In a similar manner, any other flip-flop in store 213 in the CLEAR condition clears a corresponding flip-flop in downcounter 140.

Each of the Q outputs of the flip-flops in store 213 is connected to an input of an AND gate in gates 214. Three of these AND gates are shown in FIG. 2 and are identified as AND gates 233 through 235. The other inputs to AND gates 233 through 235 are connected to input terminal R of counter check circuit 142. Thus, if a flip-flop in store 213, such as flip-flop 224, is SET, it applies a "1" bit to AND gate 233 to enable the AND gate. When the number in store 213 is to be stuffed into counter 140, the sample pulse is applied through AND gate 154 and then passes through the enabled AND gate 233 and is applied via one of leads 211 to the S input terminal of flip-flop 201 to place this flip-flop in the SET condition. In a similar manner, any other flip-flop in store 213 in the SET condition sets a corresponding flip-flop in downcounter 140.

Refer now to the details of state logic circuit 143, shown in FIG. 3. Initially, we have assumed that state logic circuit 143 is in the normal state. In this state, A flip-flop 301 and B flip-flop 302 are in the CLEAR condition. The Q outputs of these flip-flops are connected by way of leads 306 and 307 to output terminals A and B of state logic circuit 143 and, with the flip-flops in the CLEAR condition, "0" bits are therefore applied to these output terminals to indicate that state logic circuit 143 is in normal state "00". The $\overline{Q}$ outputs of flip-flops 301 and 302 are connected to AND gate 320. This enables the AND gate to apply a "1" bit to output terminal 3 of the interface unit. This "1" bit designates that a comparison check with the associated incoming pilot has resulted in a good status indication. The "1" bit at the output of gate 320 is also applied by way of OR gate 321 to clamp C flip-flop 303 and C-1 flip-flop 304 in the CLEAR condition. The $\overline{Q}$ output of flip-flop 303 is connected by way of lead 308 to output terminal C of state logic circuit 143. A "1" bit is therefore applied to output terminal C, indicating that state logic circuit 143 is not in an intermediate step state.

The comparison check signal on lead 246 is monitored by flip-flop 305. More specifically, the signal on lead 246 is applied to the input J terminal of flip-flop 305 and the inversion of the signal is applied by inverter 309 to the input K terminal of flip-flop 305. So long as a substantial match is maintained, the potential on lead 246 is high, as previously described, applying a high potential to the input J terminal of flip-flop 305. The toggling of flip-flop 305 will, therefore, place it or maintain it in the SET condition, which condition is now initially assumed.

With flip-flops 301 and 302 CLEAR and flip-flop 305 SET, AND gates 310 through 315 are all disabled. "0" bits are therefore applied through OR gates 316 and 318 to the input J terminals of flip-flops 301 and 302 and these "0" bits are inverted by inverters 317 and 319 to apply "1" bits to the input K terminals or flip-flops 301 and 302. The toggling of these latter flip-flops therefore places them or maintains them in the CLEAR condition. This condition is maintained so long as counter check circuit 142 keeps finding substantial comparison matches.

Assume now that there is a comparison mismatch. The potential on output lead 246 goes down and inverter 309 applies a "1" bit to the input K terminal of flip-flop 305. The transfer pulse is applied via lead 146 to the T terminal of flip-flop 305. At the termination of the transfer pulse flip-flop 305 is therefore toggled to the CLEAR condition. The $\overline{Q}$ output of flip-flop 305 is connected to one input of AND gate 312. The other two inputs to the AND gate are connected to the $\overline{Q}$ outputs of flip-flops 301 and 302. AND gate 312 is therefore enabled, applying a "1" bit by way of OR gate 318 to the J input of flip-flop 302.

The generation of the state pulse by timing pulse generator 141 provides a pulse by way of lead 147 to the T terminals of flip-flops 301 and 302. Upon the termination of this pulse, flip-flop 302 is toggled to the SET condition. This now applies a "1" bit from the Q output terminal of flip-flop 302 to output terminal B of state logic circuit 143, whereby the logic circuit goes to state "01", indicating that the logic circuit is presuming that there is a momentary malfunction. With flip-flop 302 SET and flip-flop 304 CLEAR, AND gate 315 is enabled and this provides a "1" bit by way of OR gate 318 to the J input terminal of flip-flop 302. At the same time, gate 320 is disabled. This applies a "0" bit to output terminal 3 of the interface unit, thus passing a bad status signal to output lead 112. The removal of the "1" bit previously passed through OR gate 321 also removes the clamp on flip-flops 303 and 304.

As previously noted, when the sample pulse is next generated the stored number is stuffed into counter 140; the counter number is read on the fly; and a good comparison check is obviously obtained. This reapplies a "1" bit to input terminal J of flip-flop 305. Consequently, at the termination of the transfer pulse, flip-flop 305 is replaced in the SET condition. This, in turn, disables AND gate 312. At the same time, with the clamp removed from flip-flop 303, the transfer pulse toggles the flip-flop to the SET condition. A "0" bit from the $\overline{Q}$ terminal output of flip-flop 303 is now passed by way of lead 308 to output terminal C. This designates that state logic circuit 143 is going into the intermediate step state. The subsequent state pulse does not change the state of flip-flops 301 and 302, it being recalled that AND gate 315, enabled, maintains a "1" bit on input terminal J of flip-flop 302. The reset pulse provides no function at this time.

In the next cycle of the countdown timing wave, the sample pulse again enables counter check circuit 142 to read the number in counter 140, on the fly, and counter check circuit 142 provides another number comparison. If this number check is good, a "1" bit is maintained on the input J terminal of flip-flop 305. At the termination of the transfer pulse, flip-flop 305 remains in the SET condition and flip-flop 304 is now toggled to the SET condition. With flip-flop 304 in the SET condition, AND gate 315 is again disabled. Since all of AND gates 310 through 315 are now disabled, the subsequent state pulse toggles flip-flop 302 back to the CLEAR condition. This re-enables AND gate 320, providing the good status signal back on output terminal 3 and reapplies the clamp back on flip-flops 303 and 304 by way of OR gate 321. Flip-flops 303 and 304 are thus placed back in the CLEAR condition; "0" bits are reapplied to output terminals A and B; and a "1" bit is applied to output terminal C.

Assume now that in the next cycle of the countdown timing wave the number check reveals a mismatch rather than a match. A "1" is therefore applied to the input K terminal of flip-flop 305. At the termination of the transfer pulse, flip-flop 305 is toggled to the CLEAR condition and flip-flop 304 is concurrently toggled to the SET condition. With flip-flop 305 in the CLEAR condition, flip-flop 304 in the SET condition and flip-flop 302 in the SET condition, AND gate 311 is enabled. This provides a "1" bit by way of OR gate 316 to the J input terminal of flip-flop 301.

At this time state logic circuit 143 is monitoring the status condition of the other interface unit. This status condition is received over lead 122 and input terminal 7 and is applied to AND gate 313. Assuming that the status of the other interface unit is good, a "1" bit is provided by the other interface unit to partially enable AND gate 313. With flip-flop 304 in the SET condition and flip-flop 305 in the CLEAR condition, AND gate 313 is enabled, applying a "1" bit by way of OR gate 318 to the input J terminal of flip-flop 302. The subsequent state pulse now toggles both flip-flops 301 and 302; flip-flop 301 being toggled to the SET condition and flip-flop 302 being maintained in the SET condition. With flip-flops 301 and 302 SET, "1" bits are applied to terminals A and B of state logic circuit 143. This designates the "11" logic state wherein there is presumed to be a prolonged malfunction of the pilot supplying the interface unit and the other interface unit pilot supply has a good status. With flip-flop 304 SET the next subsequent reset pulse enables AND gate 323. AND gate 323, when enabled, applies a clamping voltage through OR gate 321 to the C terminal inputs of flip-flops 303 and 304. Flip-flops 303 and 304 are driven to the CLEAR condition. This passes a "1" bit to output terminal C of logic circuit 143 and, in addition, disables AND gate 323 to remove the clamping voltage. With flip-flop 304 CLEAR, AND gate 314 is enabled by the Q output of flip-flop 301 and AND gate 315 is enabled by the Q output of flip-flop 302.

With "1" bits on output terminals A, B and C, reference pulse generator 144 is enabled, as previously disclosed, to monitor the countdown wave output of the other interface unit and to thereafter reset counter 140 to align it, in phase, with the downcounter of the other interface unit. In the next cycle of the loop countdown wave, timing pulse generator 141 again generates the sample pulse, enabling counter check circuit 142 to read the count, on the fly, and check it with the stored number. This check is, of course, probably bad since counter 140 has just been realigned. A "1" bit is therefore still applied to input terminal K of flip-flop 305.

As previously described, with outputs A and C of state logic circuit 143 both positive, AND gate 151 is enabled. This provides a "1" bit by way of OR gate 152 to enable AND gate 150. The next transfer pulse generated by timing pulse generator 141 is passed by AND gate 150 and lead 340 to the input T of counter check circuit 142. This causes the count in store 212 to overwrite the stored number in store 213. The transfer pulse also sets flip-flop 303 and maintains flip-flop 305 in the CLEAR condition. The setting of flip-flop 303 reapplies a "0" bit to output terminal C, indicating the start of a new "intermediate step" state. The state pulse now toggles flip-flops 301 and 302. Since gates 314 and 315 were previously enabled, both flip-flops 301 and 302 are maintained in their SET condition. The subsequent reset pulse provides no function at this time.

In the next cycle of the countdown timing wave the sample pulse again reads out the count number and compares it with the store number. Assume now that a comparison match is found. A "1" bit is thereupon applied to the input J terminal of flip-flop 305. A transfer pulse now sets flip-flop 305 and at the same time sets flip-flop 304. This disables AND gates 314 and 315. When the state pulse is generated flip-flops 301 and 302 are cleared. This enables AND gate 320, applying the clamping voltage to the input C terminals of flip-flops 303 and 304 and passing a good status signal to output terminal 3. The clearing of flip-flops 301 and 302 applies "0" bits to output terminals A and B and the clearing of flip-flop 303 applies a "1" bit to output terminal C. This designates the return to the normal "good status" state.

Assume now, however, that when the numbers are compared a mismatch is found. A "1" bit is therefore applied to input terminal K of flip-flop 305. When the transfer pulse sets flip-flop 304 it now clears flip-flop 305. Assuming that the other interface unit has good status, AND gates 311 and 313 are again enabled. Flip-flops 301 and 302 are, therefore, maintained SET in response to the state pulse. With flip-flop 304 SET, the reset pulse enables AND gate 323, which again clears flip-flops 303 and 304. A "1" bit is now reapplied to output terminal C and reference pulse generator 144 again monitors the countdown wave output of the other interface unit. The abovedescribed sequence is therefore repeated.

Assume now that, with state logic circuit 143 in state "01" or "11", a mismatch is found and state logic circuit 143 receives a bad status signal from the other interface unit. When the transfer pulse is generated flip-flop 304 is SET, as described above, the flip-flop 305 is CLEAR. AND gate 311 is now enabled but the bad status signal from the other interface unit precludes the enablement of AND gate 313 and this latter gate is maintained disabled. When the state pulse is generated, flip-flop 301 is maintained in, or toggled to, the SET condition. Flip-flop 302, however, is toggled to the CLEAR condition since all of gates 312, 313 and 315 are disabled. The reset pulse now enables gate 323 and this clears flip-flops 303 and 304. With flip-flops 302 and 303 CLEAR and flip-flop 301 SET, "1" bits are applied to terminals A and C and a "0" bit is applied to terminal B. This designates the prolonged malfunction state "10" wherein the other interface unit is indicating it has a bad pilot status. At this time, AND gate 314 is enabled since its inputs are connected to the Q terminal of flip-flop 301 and the $\overline{Q}$ terminal of flip-flop 304.

With state logic circuit 143 in state "10" and a "1" bit applied to terminal C, reference pulse generator 144 now monitors the loop output wave on lead 109, resetting counter 140 and releasing the counter to phase align it with the phase-locked loop. In the next cycle of the countdown timing wave the sample pulse again enables the number check which is probably bad since counter 140 has just been aligned. This provides a "1" bit to input terminal K of flip-flop 305. The transfer pulse now overwrites the stored number, sets flip-flop 303 and maintains CLEAR flip-flop 305. The setting of flip-flop 303 again applies a "0" bit to output terminal C, indicating an "intermediate step" state. When the state pulse is generated, flip-flop 301 is maintained in the SET state due to the enabling of AND gate 314 and flip-flop 302 is maintained in the CLEAR state since none of gates 312, 313 or 315 has been enabled. The reset pulse thereafter generated provides no function at this time.

In the next cycle of the loop countdown wave a new reading and number check is made. If the check is good, flip-flop 305 is toggled to the SET condition by the termination of the transfer pulse and flip-flop 304 is toggled to the SET condition at the same time. This now disables AND gate 314 and thereafter the state pulse toggles flip-flop 301 to the CLEAR condition; AND gate 320 is enabled, whereby flip-flops 303 and 304 are clamped to the CLEAR condition; "0" bits are reapplied to terminals A and B and a "1" bit is reapplied to terminal C; while the good status signal is passed to output terminal 3 of the interface unit. State logic circuit 143 is thereby restored to the initial "00" state.

If, at the beginning of the next cycle of the loop countdown wave, the number check finds a mismatch, flip-flop 305 is toggled to, or maintained in, the CLEAR condition while flip-flop 304 is concurrently toggled to the SET condition. With flip-flops 301 and 304 SET and flip-flop 305 CLEAR, AND gate 310 is enabled. This applies a "1" through OR gate 316 to the input J terminal of flip-flop 301. Accordingly, the state pulse maintains flip-flop 301 in the SET condition. The subsequent reset pulse then clears flip-flops 303 and 304, as previously described. This reapplies a "1" bit to output terminal C of logic circuit 143 and reference pulse generator 144 is reenabled to monitor the loop output wave on lead 109 and thus repeat the above-described operation sequence of state logic circuit 143 in logic state "10".

Reference pulse generator 144 principally consists of flip-flops 350 and 351, together with logic gates 352 through 355 and inverters 356 and 357. In the normal initial condition flip-flop 350 is in the CLEAR condition, for reasons described hereinafter. The $\overline{Q}$ output of flip-flop 350 is connected to the terminal C input of flip-flop 351, maintaining flip-flop 351 in the CLEAR condition. With flip-flop 350 in the CLEAR condition, a "0" bit from output terminal Q is applied to gate 352. The output of gate 352 is therefore low and this low condition is applied by way of lead 208 to OR gates 204 through 206 in downcounter 140. Since, as previously described, the OR gates apply a clamping condition to the downcounter in response to a positive potential, the output of reference pulse generator 144 does not affect the operation of downcounter 140 at this time.

Assume now that state logic circuit 143 goes to logic state "11". Initially, state logic circuit 143 is also applying a "1" bit to output terminal C. This "1" bit is inverted by inverter 357 in reference pulse generator 144 to thereby apply a "0" bit to input terminal C of flip-flop 350. This "0" bit therefore has no affect on the flip-flop at this time. The "1" bits on output terminals A and B of state logic circuit 143 are passed by way of leads 306 and 307 to AND gate 353. The third input to gate 353 extends to terminals 5 of the interface unit and terminal 5, in turn, is connected by way of lead 121 to the pilot countdown wave output of the other interface unit. Accordingly, AND gate 353 is enabled with the pilot countdown wave of the other interface unit is positive, and gate 353, under this condition, applies a positive potential through OR gate 355 to the input T terminals of flip-flops 350 and 351.

AND gate 353 continues to monitor the pilot countdown wave output of the other interface unit. At the beginning of the cycle, this countdown wave goes negative and a corresponding negative transition is passed by AND gate 353 and OR gate 355 to toggle flip-flop 350 to the SET condition. Flip-flop 351 is not affected at this time since flip-flop 305 has been clamping flip-flop 351 to the CLEAR condition. Thus, flip-flop 350 is SET, applying a "1" bit to AND gate 352 while flip-flop 351 is CLEAR, applying a "1" bit from its $\overline{Q}$ output terminal to the other input of AND gate 352. AND gate 352 is therefore enabled and passes a positive potential by way of lead 208 to OR gates 204 through 206 in downcounter 140. This results in the clamping of downcounter 140 to the zero count and maintaining counter 140 in this zero count so long as the positive clamping voltage on lead 208 is maintained.

The potential of the pilot countdown wave output of the other interface unit again goes positive in the middle of its cycle, re-establishing the positive potential output of AND gate 353. This potential returns to negative at the beginning of the next cycle of the pilot countdown wave output of the other interface unit. AND gate 353 therefore passes a negative transition through OR gate 355. With flip-flop 350 SET, the clamping voltage has been removed from flip-flop 351. The negative transition output of OR gate 355 therefore toggles flip-flop 351 to the SET condition. Flip-flop 350 remains in the SET condition since its input K terminal is connected to ground.

The setting of flip-flop 351 applies a "0" bit from its $\overline{Q}$ output terminal to AND gate 352. The output potential of the AND gate therefore goes down and this relatively negative potential is passed by way of lead 208 to downcounter 140, removing the clamping voltage from the downcounter. Thus, the downcounter is released to initiate its count at the instant that the cycle of the pilot countdown wave of the other interface unit begins. It is apparent therefore that downcounter 140 is aligned in phase with the downcounter of the other interface unit.

Thereafter, state logic circuit 143 goes to the intermediate step state. This applies a "0" bit to output terminal C. This "0" bit is inverted by inverter 357 and passed to input terminal C of flip-flop 350. Flip-flop 350 is thereupon clamped in the CLEAR condition, clamping, in turn, flip-flop 351 to the CLEAR condition. Reference pulse generator 144 is thus restored to its initial condition. Thereafter, reference pulse generator 144 will again monitor the pilot countdown wave output of the other interface unit if state logic circuit 143 completes its intermediate step state and stays in logic state "11".

Assume now that state logic circuit 143 goes to logic state "10". The "1" bit on terminal A of state logic circuit 143 is applied by way of lead 306 to AND gate 354. The "0" bit on output terminal B is passed through lead 307 to inverter 356. This inverts the bit to a "1" bit, which is also applied to AND gate 354. A third input of AND gate 354 extends by way of terminal 6 of the interface unit to lead 109, which, as previously described, carries the phase-locked loop output wave. Thus, if the loop output wave is positive, or when it goes positive, AND gate 354 passes a positive potential through OR gate 355 to the TOGGLE inputs of flip-flops 350 and 351.

The phase-locked loop output wave goes negative at the beginning of its cycle and AND gate 354 provides a negative transition at its output. This negative transition is passed by OR gate 355 to toggle flip-flop 350 to the SET condition. With flip-flop 350 SET and flip-flop 351 CLEAR, AND gate 352 is enabled and clamps downcounter 140 to the zero count, as previously described. Thereafter, in the middle of the next cycle, the phase-locked loop output wave again goes positive and AND gate 354 re-establishes the positive potential at its output. The phase-locked loop output wave again goes negative at the beginning of the next subsequent cycle. AND gate 354 therefore passes a negative transition through OR gate 355 to toggle flip-flop 351 to the SET condition. AND gate 352 is thereupon disabled to release downcounter 140 at the instant that the loop output wave starts its new cycle. Thereafter, state logic circuit 143 goes to the intermediate step state, applying a "0" bit to output terminal C. This "0" bit, as previously described, is inverted by inverter 357 to clamp flip-flop 350 to the CLEAR condition, clearing, in turn, flip-flop 351. Reference pulse generator 144 is thereupon restored to the initial condition.

Although a specific embodiment of this invention has been shown and described, it will be understood that various modifications may be made without departing from the spirit of this invention.

We claim:

1. A circuit for comparing the phase of timing signals with the phase of clock signals comprising, means for producing the timing signals, said producing means also including means for producing running indications defining phases of each cycle of the timing signals;

means for storing a phase-defining indication;

means for reading the running indication produced by the producing means when the clock signal is at a selected phase; and means for comparing the read running indication and the stored indication;

CHARACTERIZED BY means responsive to a substantial comparison match for writing the read indication into the storing means to replace the stored indication.

2. A circuit, in accordance with claim 1, wherein the producing means comprises a downcounter which down counts a pilot wave to produce the timing signals and the running indications comprise counts in each downcount cycle and the storing means comprises means for storing a count.

3. A circuit, in accordance with claim 2, wherein there is also included means responsive to a comparison mismatch for modifying the cyclic operation of the producing means to produce a count corresponding to the stored count when the clock signal is at the selected phase.

4. A circuit for comparing the phase of timing signals with the phase of clock signals from a clock circuit comprising, means for producing counts defining phases of each cycle of the timing signals;

a storage circuit;

means responsive to the clock signals for writing into the storage circuit the count produced when the clock signal is at a selected phase during one of its cycles;

means for comparing the count in the storage circuit to the count produced when the clock signal is at the selected phase during a succeeding one of the cycles; and means responsive to a comparison mismatch for modifying the cyclic operation of the producing means to produce the count stored in the storage circuit when the clock signal is at the selected phase.

5. A circuit, in accordance with claim 4, wherein the timing signals are applied to the clock circuit and the clock circuit is controlled by the timing signals.

6. A circuit in accordance with claim 5, and including means responsive to the comparison mismatch for precluding the application of the timing signals to the clock circuit.

7. A circuit in accordance with claim 6, wherein the producing means is responsive to a pilot signal, the producing means being further arranged to down count the pilot signal to thereby also produce the timing wave.

8. A circuit for supplying a timing wave to a wave-controlled clock pulse generator comprising, means for counting down a pilot signal to produce a down counted pilot signal and to produce counts defining phases of each cycle of the counting down means;

means for comparing a count of the counting down means produced when the clock pulse is at a selected phase with a stored count;

means responsive to a substantial comparison match for overwriting the stored count with the produced count; and other means responsive to a comparison mismatch for modifying the cycling of the counting down means to produce a count defining a predetermined phase when the clock pulse is at the predetermined phase.

9. A circuit, in accordance with claim 8, wherein there is included other means responsive to a comparison mismatch for precluding the application of the down counted pilot signal to the clock pulse generator.

10. A circuit, in accordance with claim 8, wherein there is included further means responsive to an initial comparison mismatch for modifying the cycling of the counting down means to produce a count defining the selected phase when the clock pulse is at the selected phase and means responsive to the further modifying means for enabling the other modifying means to respond to a subsequent comparison mismatch.

11. A circuit for supplying a timing wave to a wave-controlled clock pulse generator comprising, at least two interface units, each unit including means for counting down a pilot signal to produce a down counted pilot signal and to produce counts defining phases of each cycle of the counting down means; and means responsive to the down counted pilot signals produced by the two interface units for supplying the timing wave to the generator;

each unit further including, means for comparing a count produced when the clock pulse is at a selected phase with a stored count;

means responsive to a substantial comparison match for replacing the stored count with the count compared therewith;

means responsive to a comparison mismatch for changing the count of the counting down means to modify the phase of the cyclic operation;

further means responsive to a substantial comparison match for applying the down counted pilot signal produced by the counting down means of the unit to the generator; and further means responsive to a comparison mismatch for precluding the application of the down counted pilot signal produced by the counting down means of the unit and for applying to the generator the down counted pilot signal produced by the counting down means of the other unit.

12. A circuit, in accordance with claim 11, wherein the changing means is responsive to the comparison mismatch for modifying the cyclic operation of the counting dowm means to produce a count corresponding to the stored count when the clock pulse is at the selected phase.

13. A circuit, in accordance with claim 11, wherein the changing means is jointly responsive to the comparison mismatch and to a comparison match found by the comparing means of the other unit for modifying the cyclic operation of the counting down means to produce a count concurrently with the counting down means of the other unit producing a corresponding count.

14. A circuit, in accordance with claim 11, wherein the changing means is jointly responsive to the comparison mismatch and to a comparison mismatch found by the comparing means of the other unit for modifying the cyclic operation of the counting down means to produce a count defining a predetermined phase concurrently with the clock pulse signal passing through the predetermined phase.

* * * * *